Dec. 30, 1941.   F. G. CORNELL, JR   2,267,898
CHURN AND BUTTER WORKER
Filed April 30, 1940

INVENTOR
Fritz G. Cornell, Jr.
BY Kenyon & Kenyon
ATTORNEYS.

Patented Dec. 30, 1941

2,267,898

UNITED STATES PATENT OFFICE 2,267,898

CHURN AND BUTTER WORKER

Fritz G. Cornell, Jr., Mountain Lakes, N. J.

Application April 30, 1940, Serial No. 332,457

2 Claims. (Cl. 259—81)

This invention relates to barrel type churns and butter workers and more especially to such devices in which the barrel is of generally parallelepipedonal shape. Heretofore, the walls of such type barrel have been almost smooth with the result that during the churning operation the cream flows freely over the walls and during the working operation the mass of butter slides along the barrel wall, thereby breaking down the fat globules on the surface of the butter with resulting objectionable "oiling off," or sticky, greasy bodies.

An object of this invention is a churn and butter worker of the above-mentioned type having provision for subjecting the cream during the churning operation to maximum agglomerating effect while minimizing sliding of the mass of butter along the barrel walls during the working operation.

In a churn and butter worker embodying this invention, the barrel is composed of any metal, to the surface of which butter does not stick and is supported at two opposite corners for rotation about a diagonal as an axis. In one embodiment, the barrel is composed of two substantially similar parts joined in a plane angulated to the axis of rotation. The inner surface of the receptacle is smooth except for a plurality of ribs extending fan-wise from the corners at which the receptacle is supported. Such ribs are effective to subject the cream to severe concussion during the churning operation and to reduce the amount of sliding of the butter mass along the barrel walls during the working operation. The ribs cause the butter mass to be dropped through space during rotation of the barrel rather than to slide downwardly along the barrel walls. Preferably, the barrel is provided with flattened corners and a rod extends axially of the barrel, such rod serving to break the fall of the mass of butter during the working operation. Also means may be provided for circulating an attemperating liquid in heat exchange relation to the barrel walls.

Other objects, novel features and advantages of this invention will become apparent from the following specification and accompanying drawing, wherein.

Figure 1:
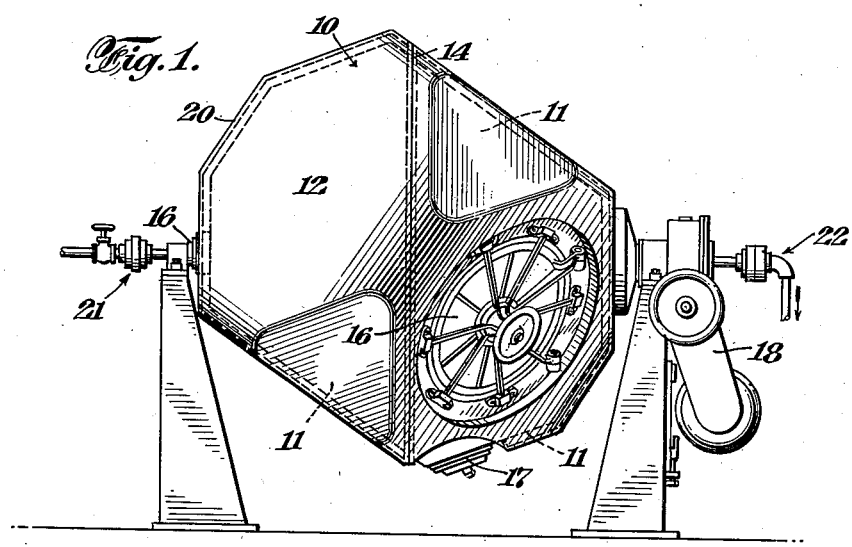
Fig. 1 is an elevation of a combined churn and butter worker embodying the invention.
Figure 2:
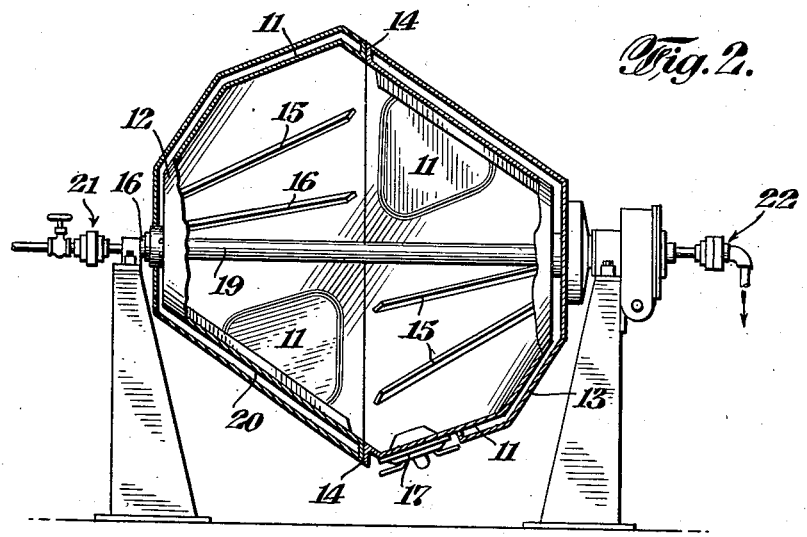
Fig. 2 is a vertical section through the churn.

The barrel or cream receptacle 10 is of cube shape with the corners flattened as indicated at 11. The receptacle which is composed of a metal to the surface of which butter will not stick is rotatably supported at two opposite corners for rotation about a diagonal as an axis. In the embodiment herein shown, the barrel consists of two substantially similar parts 12 and 13, each having a flange 14 and said flanges being permanently interjoined by any suitable means in a plane angulated to the axis of rotation. As the barrel 10 is rotated, first a corner on one side of the flanges 14 and then a corner on the opposite side of the flanges 14 assumes its lowermost position with the result that the contents of the barrel move from one side to the other of the flange line, thus subjecting the contents to violent agitation. On each inner face of the cubical barrel are provided two or more rectilinear ribs 15 extending fan-wise from the supported corners and reaching nearly to the joining line of the two parts 12 and 13. Each of these ribs lies in the same plane with the axis of rotation and the end of each rib is slightly cut back so that it does not interfere with the free flow of liquid to the lowermost part of the receptacle.

After a suitable charge of cream has been introduced into the barrel, it is rotated in the usual manner by any suitable driving means 18. The cream is subjected to violent agitation due to the shape and manner of support of the barrel and also is subjected to severe concussion by the ribs 15, thereby effecting substantial reduction in churning time. After the cream has been sufficiently churned, the buttermilk is drained from the barrel and the retained butter fat is washed and treated in the usual manner, after which the butter is worked by further rotation of the barrel. In the working operation, the mass of butter is caused to drop from a high elevation in the barrel to the bottom thereof due to the action of the ribs 15 which prevent sliding of the butter along the barrel wall and cause the butter to be lifted by the rotation of the barrel. With this arrangement, the butter is subjected to increased concussion rather than the usual sliding and the harmful effect of sliding friction on the butter fat globules is substantially avoided and "oiling off" is reduced to a minimum.

In one wall of the barrel is provided a door 16, by means of which a cream charge may be introduced into the barrel and through which the finished butter may be removed. Also, in one corner of the receptacle is provided a drainage valve 17, by means of which buttermilk and other liquid may be drained from the barrel as required.

During the operation of working the butter by rotation of the receptacle 10, the mass of butter moves into successive peripheral corners of the receptacle on opposite sides of the flange line and is thus subjected to severe concussion. The provision of blunt corners minimizes the tendency of the butter to stick in the corners and also the side wall tension on the butter is reduced. Furthermore, the flattened corners have the advantage of greater ease in cleaning and simplicity of manufacture. By use of the flattened corners the shock or hammering due to movement of butter into the lowermost corner is reduced to a minimum.

Preferably there is provided in the barrel 10 a bar 19 extending axially thereof. Such bar serves to break the fall of the butter during the working operation. Also, a jacket 20 is preferably supplied around the major exterior surface of the barrel, thus providing means for circulating attemperating liquid in heat exchange relation to the barrel walls. By the use of a cooling liquid in such jacket, the churning and working time may be materially altered as desired.

Although the barrel 10 has been illustrated as cube shape, it is to be understood that it may be any receptacle coming within the definition of parallelepipedonal. Furthermore, while the barrel has been illustrated with blunt corners, the invention is also applicable to a churn structure having sharp corners. Also, it is to be understood that various modifications may be made in the structure above described, without in any way departing from the spirit of the invention as defined in the appended claims.

I claim:

1. A churn and butter worker comprising a closed parallelepipedonal receptacle, means supporting said receptacle at opposite corners for rotation about a diagonal as an axis, said receptacle being composed of two substantially similar parts interjoined in a plane traversing the axis of rotation substantially at right angles thereto, and continuous plane surface rectilinear ribs on the inner surface of each receptacle face lying in planes containing the axis of rotation and terminating short of the interjoining plane of said two parts to form a drainage channel substantially in said plane between the inner ends of said ribs.

2. A churn and butter worker comprising a closed receptacle composed of interjoined faces forming a parallelepipedon, means supporting said receptacle at opposite corners for rotation about a diagonal as an axis, and continuous plane surface rectilinear ribs on the inner surface of each receptacle face lying in planes containing the axis of rotation and terminating short of a plane substantially perpendicular to the axis of rotation approximately midway between said supported corners to form a drainage channel substantially in said plane between the inner ends of the ribs.

FRITZ G. CORNELL, Jr.